United States Patent
Kim et al.

(10) Patent No.: US 12,041,512 B2
(45) Date of Patent: Jul. 16, 2024

(54) METHOD AND APPARATUS FOR POSITIONING USING IMAGE AND RADIO SIGNALS

(71) Applicant: ELECTRONICS AND TELECOMMUNICATIONS RESEARCH INSTITUTE, Daejeon (KR)

(72) Inventors: Keun Young Kim, Daejeon (KR); Seung Chan Bang, Daejeon (KR); Young-Jo Ko, Daejeon (KR); Kapseok Chang, Daejeon (KR); Il Gyu Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 402 days.

(21) Appl. No.: 17/563,272

(22) Filed: Dec. 28, 2021

(65) Prior Publication Data
US 2023/0101594 A1    Mar. 30, 2023

(30) Foreign Application Priority Data

Sep. 27, 2021 (KR) .................. 10-2021-0127466
Dec. 27, 2021 (KR) .................. 10-2021-0188901

(51) Int. Cl.
*H04W 4/029* (2018.01)
*G01S 5/02* (2010.01)
*G06V 20/50* (2022.01)

(52) U.S. Cl.
CPC .......... *H04W 4/029* (2018.02); *G01S 5/0264* (2020.05); *G01S 5/0273* (2013.01); *G06V 20/50* (2022.01)

(58) Field of Classification Search
CPC .... G01S 5/011; G01S 5/02585; G01S 5/0264; G01S 5/0273; G06V 10/82; G06V 20/50; H04W 4/029
See application file for complete search history.

(56) References Cited

U.S. PATENT DOCUMENTS

| | | | |
|---|---|---|---|
| 2015/0177003 A1* | 6/2015 | Ho | H04W 4/02 701/408 |
| 2020/0333427 A1* | 10/2020 | Hu | H04W 24/10 |
| 2021/0311181 A1* | 10/2021 | Chae | G01S 13/89 |

FOREIGN PATENT DOCUMENTS

| | | |
|---|---|---|
| EP | 3 538 913 B1 | 8/2020 |
| KR | 10-2225632 B1 | 3/2021 |

\* cited by examiner

*Primary Examiner* — Kashif Siddiqui
(74) *Attorney, Agent, or Firm* — LRK PATENT LAW FIRM

(57) ABSTRACT

A positioning method using images and radio waves may include: estimating a distance and an angle from the positioning reference node to a positioning target terminal; identifying an obstacle or reflective object in a vicinity of the positioning target terminal or on a path between the positioning target terminal and the positioning reference node by using image information on the positioning target terminal at a position estimated by the distance and the angle; estimating an incident angle or a reflection angle of a radio wave signal reflected by the reflective object identified based on the image information; and estimating a position of the positioning target terminal based on the reflection angle and the distance.

16 Claims, 9 Drawing Sheets

METHOD AND APPARATUS FOR POSITIONING USING IMAGE AND RADIO SIGNALS

CROSS-REFERENCE TO RELATED APPLICATIONS

This application claims priority to Korean Patent Applications No. 10-2021-0127466 filed on Sep. 27, 2021 and No. 10-2021-0188901 filed on Dec. 27, 2021 with the Korean Intellectual Property Office (KIPO), the entire contents of which are hereby incorporated by reference.

BACKGROUND

1. Field of the Invention

Exemplary embodiments of the present disclosure relate to a positioning method and apparatus using images and radio signals, which can acquire accurate position information for a user or measurement target located on a non-line of sight (NLOS) path by using information of images and radio wave signals in a positioning system for identification of position information of a specific user.

2. Description of Related Art

Positioning information containing user position information may be utilized in various fields or their services such as emergency services such as lifesaving, intelligent traffic information services, game services, various life convenience information services such as finding people and objects, productivity improvement services such as product production, logistics management, distribution management, and automation, and the like. In particular, the positioning information may be used for services that require high-precision accuracy of about 10 cm for use in remote control and data analysis of unmanned aerial vehicles, augmented reality, and control of moving objects in smart factories.

A representative scheme for obtaining such the positioning information is a positioning scheme such as a global navigation satellite system (GNSS), which is a satellite navigation system. However, this positioning scheme has a difficulty to use in places where it is difficult to receive satellite signals such as indoors, and it has a problem in that the positioning accuracy is lowered in case of insufficient securing of visible satellites due to a non-line of sight (NLOS) path, a multi-path environment, and a tall building.

SUMMARY

Accordingly, exemplary embodiments of the present disclosure are provided to substantially obviate one or more problems due to limitations and disadvantages of the related art. Exemplary embodiments of the present disclosure provide a positioning method and apparatus using images and radio waves, which can provide positioning information for a user or measurement target located indoors or in a dense urban area by using radio waves, and can identify position information of a user located on a LOS path from a camera by using image information.

Exemplary embodiments of the present disclosure also provide a positioning method and apparatus using images and radio waves, which use a positioning scheme combining image information and radio positioning techniques for obtaining accurate position information of a positioning target or a user terminal located on a NLOS path.

Exemplary embodiments of the present disclosure also provide a positioning method and apparatus using images and radio waves, which use radio waves in a high frequency band having small radio wave reflection effects, for example, a millimeter wave (i.e., mmWave) band or terahertz (THz) band.

According to an exemplary embodiment of the present disclosure, a positioning method using images and radio waves, performed by a positioning reference node may comprise: estimating a distance and an angle from the positioning reference node to a positioning target terminal; identifying an obstacle or reflective object in a vicinity of the positioning target terminal or on a path between the positioning target terminal and the positioning reference node by using image information on the positioning target terminal at a position estimated by the distance and the angle; estimating an incident angle or a reflection angle of a radio wave signal reflected by the reflective object identified based on the image information; and estimating a position of the positioning target terminal based on the reflection angle and the distance.

The positioning method may further comprise determining whether the positioning target terminal is located on a non-line of sight (NLOS) path.

The positioning method may further comprise in response to determining that the positioning target terminal is located on a NLOS path, estimating a distance between the positioning reference node and the reflective object on a LOS path from a camera by using the image information.

The radio wave signal may be a signal of a millimeter wave (mmWave) or terahertz (THz) band having a relatively small radio wave reflection effect.

The radio wave signal may be a signal of a millimeter wave (mmWave) or terahertz (THz) band having a relatively large bandwidth.

The radio wave signal may be a signal of a millimeter wave (mmWave) or terahertz (THz) band using a very large number of antennas.

According to another exemplary embodiment of the present disclosure, a positioning method using images and radio waves, performed by a positioning apparatus, may comprise: estimating, by each of a plurality of positioning reference nodes, a distance or an angle from each of the plurality of positioning reference nodes to a positioning target terminal; identifying, by each of the plurality of positioning reference nodes, an obstacle or reflective object in a vicinity of the positioning target terminal or on a path between the positioning target terminal and each of the plurality of positioning reference nodes by using image information on the positioning target terminal at a position range of the positioning target terminal estimated by the distance or the angle; identifying, by each of the plurality of measurement reference nodes, reflection positions of radio wave signals reflected by the reflective object identified through the image information; and estimating a position of the positioning target terminal by using an intersection of circles each of which has a radius corresponding to a distance from each of the reflection positions to the positioning target terminal.

The positioning method may further comprise determining whether the positioning target terminal is present on a non-line of sight (NLOS) path.

The radio wave signal may be a signal of a millimeter wave (mmWave) or terahertz (THz) band having a relatively small radio wave reflection effect.

The radio wave signal may be a signal of a millimeter wave (mmWave) or terahertz (THz) band having a relatively large bandwidth.

The radio wave signal may be a signal of a millimeter wave (mmWave) or terahertz (THz) band using a very large number of antennas.

According to another exemplary embodiment of the present disclosure, a positioning apparatus using images and radio waves may comprise: a processor; and a memory storing at least one instructions executable by the processor, wherein the at least one instruction causes the processor to: estimate, by each of a plurality of positioning reference nodes, a distance or an angle from each of the plurality of positioning reference nodes to a positioning target terminal; identify, by each of the plurality of positioning reference nodes, an obstacle or reflective object in a vicinity of the positioning target terminal or on a path between the positioning target terminal and each of the plurality of positioning reference nodes by using image information on the positioning target terminal at a position range of the positioning target terminal estimated by the distance or the angle; identify, by each of the plurality of measurement reference nodes, reflection positions of radio wave signals reflected by the reflective object identified through the image information; and estimate a position of the positioning target terminal by using an intersection of circles each of which has a radius corresponding to a distance from each of the reflection positions to the positioning target terminal.

The positioning apparatus may further comprise determining whether the positioning target terminal is present on a non-line of sight (NLOS) path.

The radio wave signal may be a signal of a millimeter wave (mmWave) or terahertz (THz) band having a relatively small radio wave reflection effect.

The radio wave signal may be a signal of a millimeter wave (mmWave) or terahertz (THz) band having a relatively large bandwidth.

The radio wave signal may be a signal of a millimeter wave (mmWave) or terahertz (THz) band using a very large number of antennas.

DETAILED DESCRIPTION OF THE EMBODIMENTS

Figure 1:
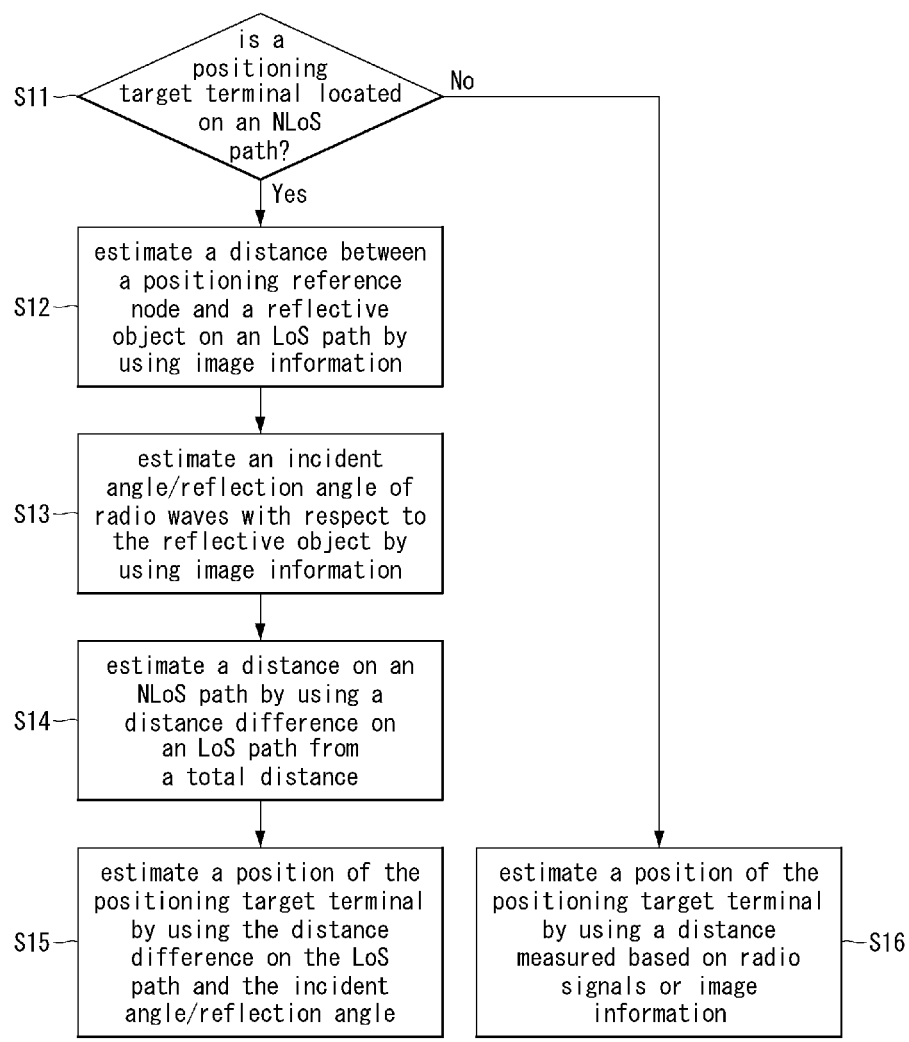
FIG. 1 is a flowchart for a positioning method using images and radio waves according to an exemplary embodiment of the present disclosure.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may mean "at least one of A or B" or "at least one of combinations of one or more of A and B". Also, in exemplary embodiments of the present disclosure, "one or more of A and B" may mean "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system or a memory system to which exemplary embodiments according to the present disclosure are applied will be described. The communication system or memory system to which the exemplary embodiments according to the present disclosure are applied is not limited to the contents described below, and the exemplary embodiments according to the present disclosure may be applied to various communication systems. Here, the communication system may be used in the same sense as a communication network.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system may be a 4G communication network (e.g., a long-term evolution (LTE) communication system or an LTE-advanced (LTE-A) communication system), a 5G communication network (e.g., a new radio (NR) communication system), or the like. The 4G communication system may support communication in a frequency band of 6 GHz or below. The 5G communication system may support communication in a frequency band of 6 GHz or above, as well as the frequency band of 6 GHz or below. The communication system to which the exemplary embodiments according to the present disclosure are applied is not limited to the contents described below, and the exemplary embodiments according to the present disclosure may be applied to various communication systems. Here, the communication system may be used in the same sense as a communication network. The 'LTE' may refer to the 4G communication system, LTE communication system, or LTE-A communication system, and the 'NR' may refer to the 5G communication system or NR communication system.

Figure 2:
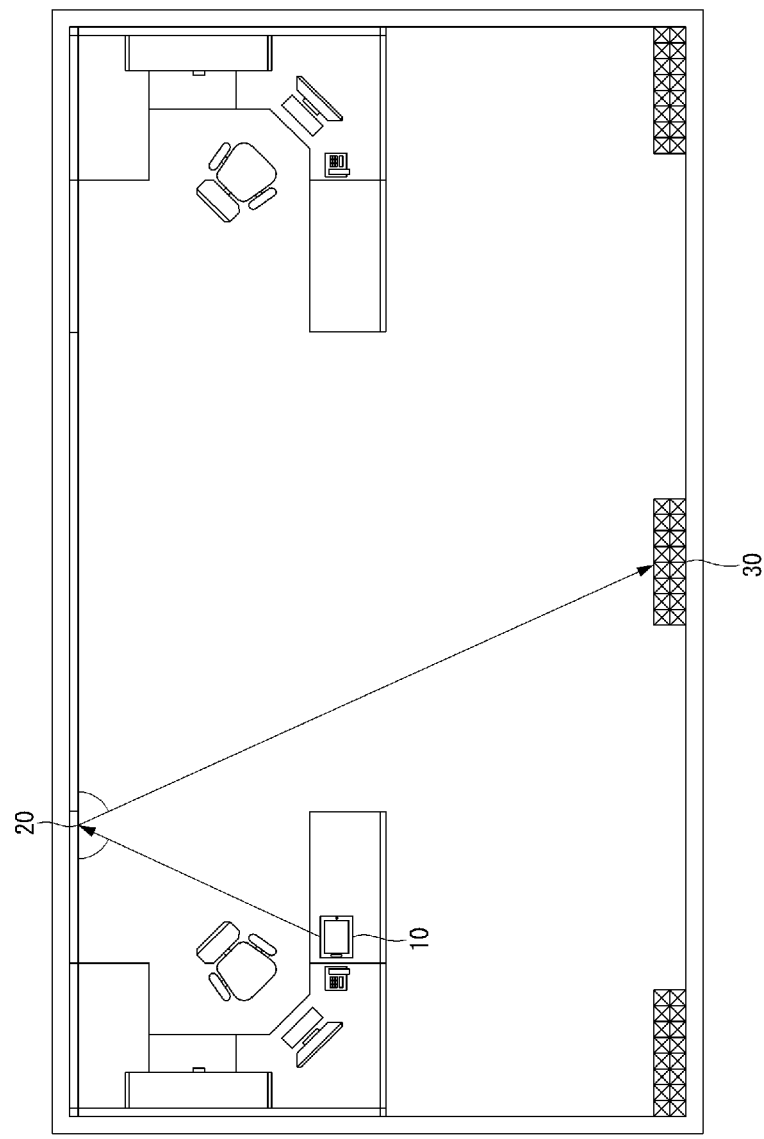
FIG. 2 is a conceptual diagram illustrating a position estimation environment to which the hybrid positioning method of FIG. 1 is applicable.

FIG. 1 is a flowchart for a positioning method (hereinafter, briefly referred to as a 'hybrid positioning method') using images and radio waves according to an exemplary embodiment of the present disclosure. FIG. 2 is a conceptual diagram illustrating a position estimation environment to which the hybrid positioning method of FIG. 1 is applicable.

Referring to FIGS. 1 and 2, the hybrid positioning method may determine whether a positioning target terminal 10 is present on a NLOS path (S11).

In the step S11, a combination of a radio signal and image information may be used as a criterion for the determination. That is, whether the positioning target terminal 10 exists on a NLOS path may be estimated by using radio wave signals, and presence of reflective objects or obstacles in the vicinity of the positioning target terminal 10 may be estimated by using image information.

Here, for matching of the positioning target terminal 10 that has transmitted radio waves and the positioning target terminal 10 identified through the image information, a method in which a positioning server (refer to 100 in FIG. 5) identifies information on the terminal that currently wants to use the positioning service may be applied. For example, information on communication radio waves and image information obtained by a positioning reference node 30, which may include a small cell, a base station, etc., may be transmitted to the positioning server, and the positioning server, which has a terminal identifier (ID) and image information for the positioning target terminal 10, may perform the matching therebetween. That is, in the present exemplary embodiment, it may be assumed that the ID of the terminal using the positioning service is transmitted to the positioning server, and that the positioning server is configured to obtain the information on the terminal from the image information corresponding to the ID of the terminal and the image information transmitted to the positioning server by utilizing deep learning image recognition technologies.

In addition, since it is well known that specifying a target terminal using image information can be performed through the current deep learning image recognition technology or deep learning video recognition technology, a detailed description thereof will be omitted.

As a result of the determination in the above determination step S11, if the positioning target terminal 10 is on a NLOS path (i.e., 'Yes' of S11), a distance between the positioning reference node 30 and a reflective object 20 may be estimated using the image information (S12). The reflective object 20 may be a reflective object without diffuse reflection. In addition, a reflective object with diffuse reflection will be described in more detail in an exemplary embodiment to be described later.

Then, an incident angle or reflection angle of a radio wave with respect to the reflective object 20 may be estimated by using the image information (S13).

Then, a distance on the NLOS path may be estimated by using a distance difference on a LOS path from the estimated total distance (S14).

Then, a position of the positioning target terminal may be estimated using the distance on the NLOS path and the incident or reflection angle (S15).

On the other hand, as a result of the determination in the above determination step S11, if the positioning target terminal 10 does not exist on a NLOS path (No' in S11), that is, if the positioning target terminal 10 exists on the LOS path from a camera, it is possible to estimate the position of the positioning target terminal by using a distance measured by the radio signal or image information (S16).

As such, according to the present exemplary embodiment, whether the radio wave measured from the positioning target terminal 10 is on a NLOS path, and the reflective objects or obstacles in the vicinity of the positioning target terminal 10 may be estimated by using the image information and the radio wave signals.

In other words, by measuring a signal propagation time between the positioning reference node 30 and the positioning target terminal 10 through the radio wave signals, a distance on a transmission path may be calculated based thereon. In addition, the position of the positioning target terminal 10 may be determined through image characteristics using the image information. Accordingly, the presence or absence of the positioning target terminal 10 on a circumference with the calculated distance as a radius may be determined using the image information.

That is, when the position of the positioning target terminal 10 within the corresponding radius is confirmed by the image information, the positioning target terminal 10 may be determined to be located on a LOS path, and when the position of the positioning target terminal 10 is not confirmed by the image information, the positioning target terminal 10 may be determined to be located on a NLOS path.

In addition, by measuring the distance on the transmission path between the positioning reference node 30 and the positioning target terminal 10 and transmission/reception signal angles therebetween, the position of the positioning target may be determined as one point which is not a position on the circumference. Also, if the positioning target terminal 10 is determined to be present at the corresponding distance and angular position through the image information, the positioning target terminal 10 may be determined to be on a LOS path, and if the positioning target terminal 10 is determine to be not present at the corresponding position, the positioning target terminal 10 may be determined to be located on a NLOS path.

In addition, if it is confirmed that there are no reflective objects or obstacles on a LOS path, since the positioning target terminal 10 may be determined to be on a LOS path, the position of the positioning target terminal 10 may be determined. Using the positioning method according to the present exemplary embodiment, it is not necessary to know in advance the image characteristics of the positioning target terminal 10.

As described above, according to the present exemplary embodiment, information on whether the positioning target terminal 10 is located on a NLOS path and information on reflective objects or obstacles present at the corresponding position can be acquired through the image information, and by measuring the distance and angle using radio wave signals, it is made possible to accurately identify information on reflective objects or obstacles located on the corresponding path by using the image information.

That is, if it is determined that the positioning target terminal exists on a NLOS path through the distance, transmission and reception angle information, and image information for the positioning target terminal 10 measured from the radio wave signals, the position of the positioning target terminal 10 may be obtained using the information on reflective objects located on a LOS path based on two schemes as follows.

First, the position of the positioning target terminal 10 on a NLOS path may be identified by estimating the angle and distance reflected through the reflective object 20.

Second, the position of the positioning target terminal 10 may be identified by measuring a plurality of distances between the plurality of positioning reference nodes 30 and the positioning target terminal 10 reflected through the reflective object.

Figure 3:
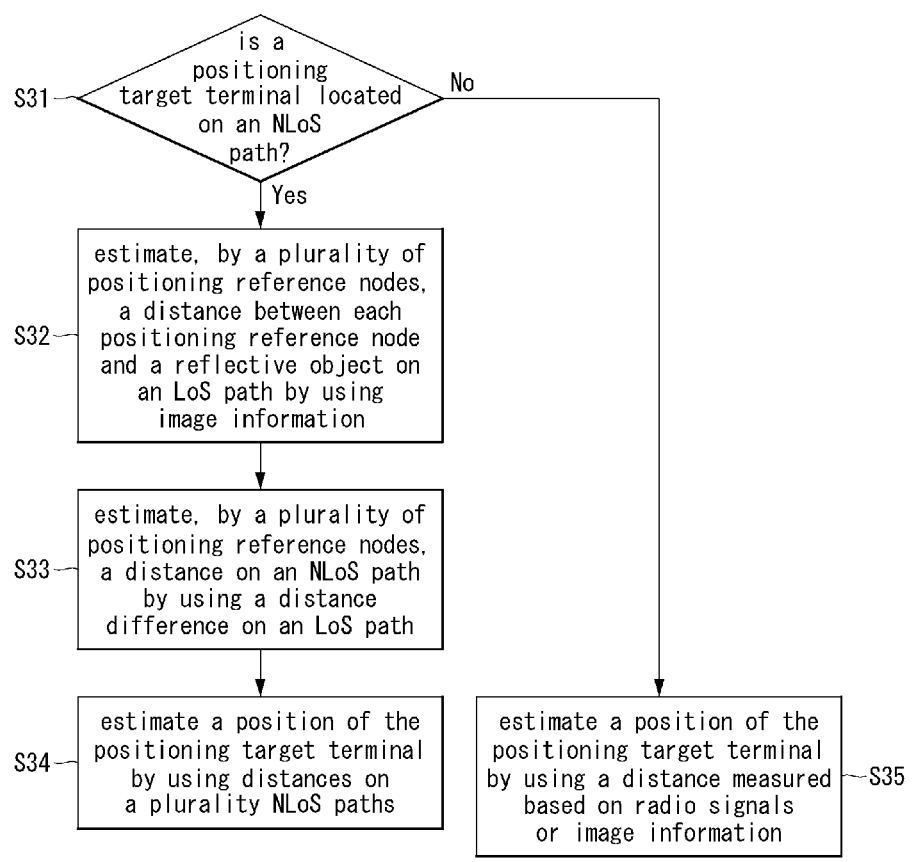
FIG. 3 is a flowchart for a hybrid positioning method using a plurality of NLOS distances according to another exemplary embodiment of the present disclosure.
Figure 4:
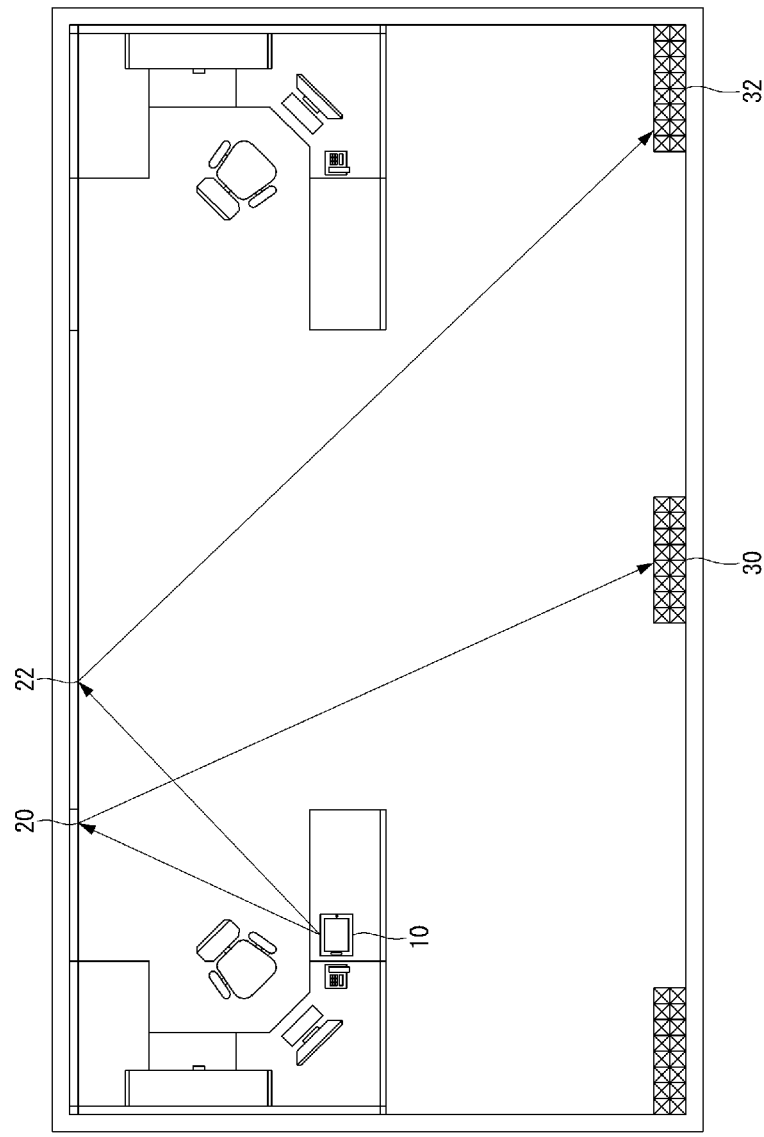
FIG. 4 is a conceptual diagram illustrating a position estimation environment using an intersection of radius distances from a reflective wall surface to which the hybrid positioning method of FIG. 3 is applicable.

FIG. 3 is a flowchart for a hybrid positioning method using a plurality of NLOS distances according to another exemplary embodiment of the present disclosure. FIG. 4 is a conceptual diagram illustrating a position estimation environment using an intersection of radius distances from a reflective wall surface to which the hybrid positioning method of FIG. 3 is applicable.

Referring to FIGS. 3 and 4, the hybrid positioning method may determine whether the positioning target terminal 10 is located on a NLOS path (S31).

As a result of the determination in the above determination step S31, if the positioning target terminal 10 is located on a NLOS path ('Yes' in S31), a plurality of positioning reference nodes 30 and 32 may estimate distances between the corresponding positioning reference nodes and reflective objects 20 and 22 by utilizing image information, respectively (S32). The plurality of positioning reference nodes 30 and 32 may be located spaced apart from each other by a predetermined interval, and each positioning reference node may be referred to as a communication node, a base station, or the like, and may be connected to a communication system through a network. In addition, the first reflective object 20 may be a reflective object without diffuse reflection located at a first position, and the second reflective object 22 may be another reflective object without diffuse reflection located at a second position spaced apart from the first position by a predetermined distance.

Then, distances on a plurality of NLOS paths may be estimated by using distance differences on LOS paths from the plurality of positioning reference nodes 30 and 32 (S33).

Then, the position of the positioning target terminal 10 may be estimated using the distances on the plurality of NLOS paths (S34).

On the other hand, as a result of the determination in the above determination step S31, if the positioning target terminal 10 is not located on a NLOS path ('No' in S31), that is, if the positioning target terminal 10 exists on a LOS path, the position of the positioning target terminal 10 may be estimated based on a distance measured by a radio signal or image information (S35).

As such, the positioning method according to the present exemplary embodiment may identify the position of the positioning target terminal on a NLOS path by estimating the angle and distance measured based on a radio signal reflected by the reflective object.

That is, the positioning method for the positioning target terminal 10 on a NLOS path through the estimation of angles and distances reflected from reflective objects may be used when the accurate reflection angles the reflective objects 20 and 22 can be estimated through image information. Based on the reflection angles measured by the positioning reference nodes 30 and 32, the angles of incidence or reflection from the reflective objects 20 and 22 may be estimated, and through these, the angles at which the radio waves are reflected may be measured.

By estimating such the angle information and distance information, the position of the positioning target terminal 10 may be identified. The case when information of reflection angles can be obtained from the surfaces of the reflective objects 20 and 22 may be a case in which no diffuse reflection exists on the surfaces of the reflective objects 20 and 22, and the incident angle and the reflection angle are the same on the surfaces of the reflective objects 20 and 22.

In addition, if reflections occur multiple times on a NLOS path, it may be difficult to estimate the exact position. If a three-dimensional (3D) map is constructed and reflection information is obtained in advance, angle information can be obtained relatively easily.

Meanwhile, in the present exemplary embodiment, the position of the measurement target terminal 10 may be determined by measuring the distances between the positioning target terminal 10 and the plurality of positioning reference nodes 30 and 32 reflected through the plurality of reflective objects.

That is, the method of determining the position of the positioning target terminal 10 by measuring a plurality of distances between the plurality of positioning reference nodes 30 and 32 and the positioning target terminal 10 may be utilized when it is difficult to estimate the reflection angles through surfaces of the reflective objects. In this case, the distance to the positioning target terminal 10 or the distances and the angles to the reflective objects 20 and 22 may be measured through radio waves received from the plurality of positioning reference nodes 30 and 32. Through this, points where the radio waves are reflected may be identified.

On the other hand, in case of a situation where only distances from reflection positions on surfaces of the plurality of reflective objects 20 and 22 to the positioning target terminal 10 are unknown, the position of the positioning target terminal 10 may be identified based on an intersection of circles each of which has a measured distance as a radius. Since the distance between the reflection position on the surface of the reflective object and the positioning target terminal 10 can be accurately identified through the image information, it is possible to more accurately estimate the position of the positioning target terminal 10 on a NLOS path, compared to the case where only the distances between the positioning reference nodes 30 and 32 and the positioning target terminal 10 are identified.

In other words, in the present exemplary embodiment, distance information or distance and angle information between the positioning target terminal 10 and the positioning reference nodes 30 and 32 can be extracted using radio wave signal information, and using these, the position of the measurement target terminal 10 existing on a NLOS path may be estimated.

However, if there is no 3D map information, the position of the positioning target terminal 10 on a NLOS path may be highly likely to be inaccurate. Also, when only image information is used, the position of the positioning target terminal 10 on a LOS path may be accurately estimated, but it is impossible to estimate the position of the positioning target terminal 10 on a NLOS path. Accordingly, in the present exemplary embodiment, if information obtained by combining radio wave signal information and image information is used, the position of the measurement target terminal 10 on a NLOS path can be estimated relatively precisely even without the 3D map information.

As described above, through the positioning method according to the present exemplary embodiment, it is possible to more accurately estimate the position of the positioning target terminal on a NLOS path, and the four main factors are as follows.

First, by using distance and angle information and image information measured through radio waves, positions of the reflective walls of obstacles can be accurately determined, and through these, only positions of the reflective walls of obstacles and position of the positioning target terminal may be estimated to improve the accuracy of distance estimation.

Second, when radio waves of millimeter wave (mmWave) or terahertz (THz) bands are used, radio waves reflected several times are reduced, so that the distance to be estimated after reflection can be shortened.

Third, accurate distance information can be estimated by increasing a signal sampling rate and improving a time domain precision by using the millimeter wave or terahertz band in which the signal attenuation is increased because the frequency band is relatively high and the radio wave reflection effect is reduced instead.

Fourth, accurate angle estimation can be performed by using a very large number of antennas that can be used when using radio waves of millimeter wave or terahertz band.

Figure 5:
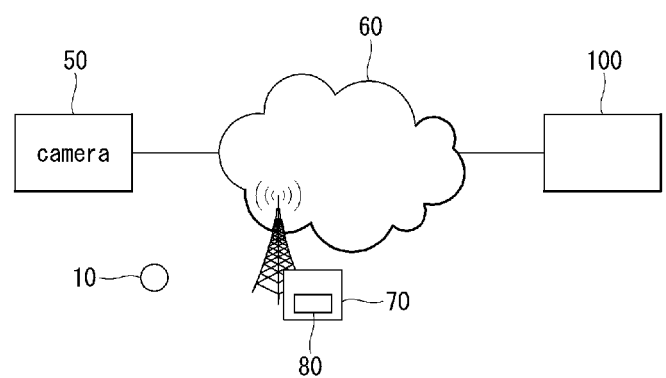
FIG. 5 is a schematic conceptual diagram of a configuration of an entire positioning system to which a positioning apparatus using images and radio waves according to another exemplary embodiment of the present disclosure (hereinafter abbreviated 'hybrid positioning apparatus') is applied.

FIG. 5 is a schematic conceptual diagram of a configuration of an entire positioning system to which a positioning apparatus using images and radio waves according to another exemplary embodiment of the present disclosure (hereinafter abbreviated 'hybrid positioning apparatus') is applied.

Referring to FIG. 5, the positioning system may include a camera 50; a hybrid positioning apparatus 80 connected to the camera 50 through a network or communication system 60; and a positioning server 100 connected to a positioning target terminal 10, the camera 50, the hybrid positioning apparatus 80, and the like through the network or communication system 60. The hybrid positioning apparatus 80 may be mounted on or coupled to a base station or communication node 70 or part of the communication system.

The positioning target terminal 10 may include a mobile user terminal, an Internet of things (IoT) terminal, a drone terminal, a vehicle terminal, an aircraft terminal, and/or the like.

The positioning system of the present exemplary embodiment may be configured to obtain accurate positioning information of the positioning target terminal. That is, the positioning system may be constructed as a system using camera images and radio wave signals for positioning reference node(s).

In this case, by using image information obtained from the camera 50 and radio wage signals, the hybrid positioning apparatus 80 of the positioning system may identify whether the positioning target terminal 10 is located on a LOS path or a NLOS path, and estimate and use information on reflective objects or obstacles in the vicinity of the positioning target terminal 10 based on a combination of the radio wave signals and the image information, thereby estimating accurate distance and angle of the positioning target terminal 10 located on a NLOS path.

In addition, in the process of performing the positioning method of the hybrid positioning apparatus 80, when diffuse reflection does not exist, the position of the positioning target terminal may be specified by using one positioning reference node. In addition, when diffuse reflection exists, the position of the measurement target terminal may be specified by combining a plurality of pieces of information measured by a plurality of positioning reference nodes and reducing measurement errors through such the combining.

In addition, according to the present exemplary embodiment, it is possible to solve problems expected in positioning using radio waves or images.

That is, positioning using radio waves or images may be relatively accurate in a situation where a LOS path between the positioning target terminal 10 carried by a user and the positioning reference node is secured. However, in case of a NLOS path, the positioning accuracy of the positioning target terminal may be lowered, and in particular, the positioning method using images may not be used.

Therefore, in order to improve positioning accuracy with respect to the positioning target terminal existing on a NLOS path, whether the positioning target terminal exists on a LOS path or a NLOS path should be identified, and if the positioning target terminal exists on a NLOS path, it should be first identified through which path the radio wave signal arrives at the positioning reference node.

In other words, when the image characteristics of the positioning target terminal 10 are known through the image information, the position of the positioning target terminal 10 on a LOS path may be identified using the image, and through this, it is possible to identify whether the positioning target terminal 10 is on a LOS path or a NLOS path.

In particular, due to the development of deep learning technology, image classification technology using image information exceeds human classification ability, so it is possible to determine the presence or absence of a specific target on a LOS path with high probability. In addition, when securing a LOS path, it is possible to perform positioning of the positioning target terminal 10 with an accuracy of an error range of about several millimeters (mm) according to the pre-established three-dimensional (3D) feature point distribution and camera specifications.

As described above, in order to obtain accurate position information of the positioning target terminal 10 existing on a NLOS path, in the present exemplary embodiment, a positioning method combining image information and radio positioning technology is used. In particular, in case of using the radio positioning technology, in order to increase positioning accuracy, relatively accurate positioning can be performed by using positioning using radio waves in the millimeter wave (mmWave) or terahertz (THz) band, which has a low radio wave reflection effect.

In general, since a signal attenuation according to distance increases as a frequency band increases, the radio wave reflection effect is reduced, and cases where the signal is transmitted through multiple paths may be reduced. For example, radio waves in a terahertz band may have wall reflections of 1 to 2 times. In addition, when using a terahertz band, since a wideband signal is transmitted, there is an advantage in that a signal sampling rate is large, and thus accurate distance information can be obtained due to improved precision in the time domain. In addition, by using transmission and reception using a very large number of antennas, it is possible to obtain accurate angle information on departure and arrival angles of the signal.

Figure 6:
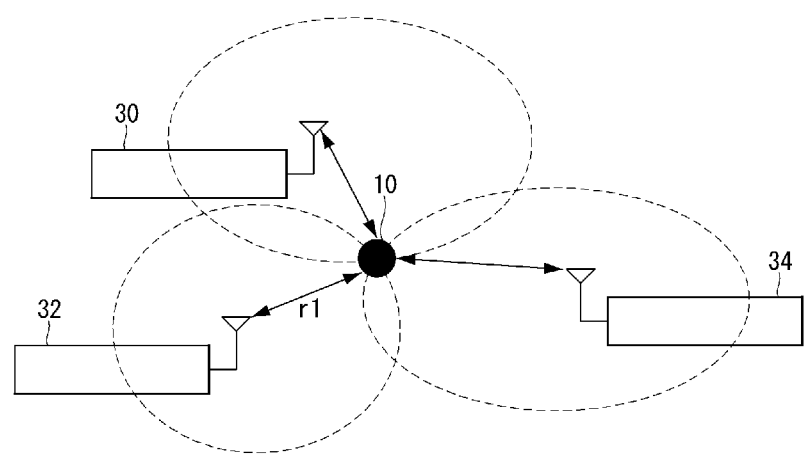
FIG. 6 is a conceptual diagram for describing a position estimation method using a radio wave signal that can be employed in the hybrid method of the present exemplary embodiment.
Figure 7:
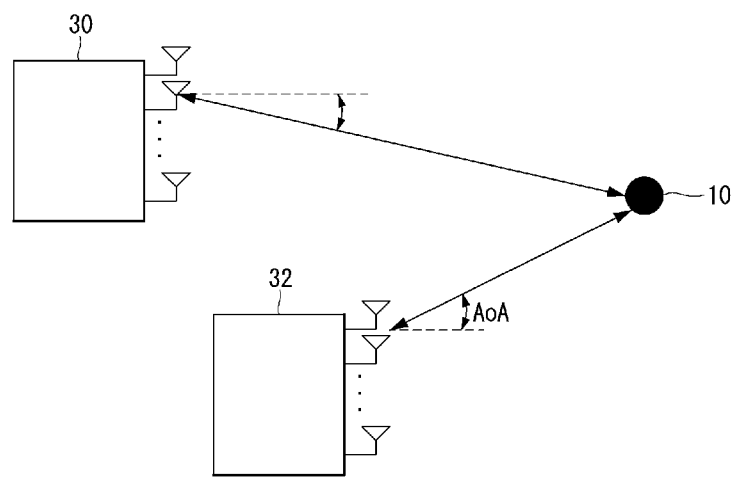
FIG. 7 is a conceptual diagram for describing an position estimation method utilizing angles that can be employed in the hybrid method of the present exemplary embodiment.
Figure 8:
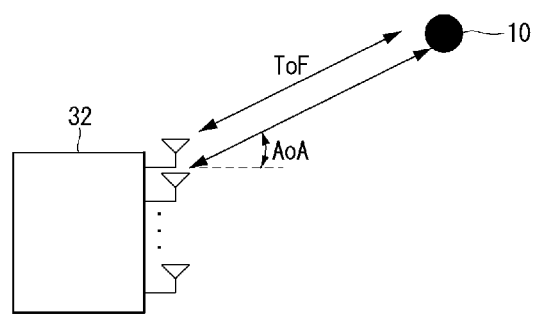
FIG. 8 is a conceptual diagram for describing a position estimation method using a distance and an angle simultaneously that can be employed in the hybrid method of the present exemplary embodiment.
Figure 9:
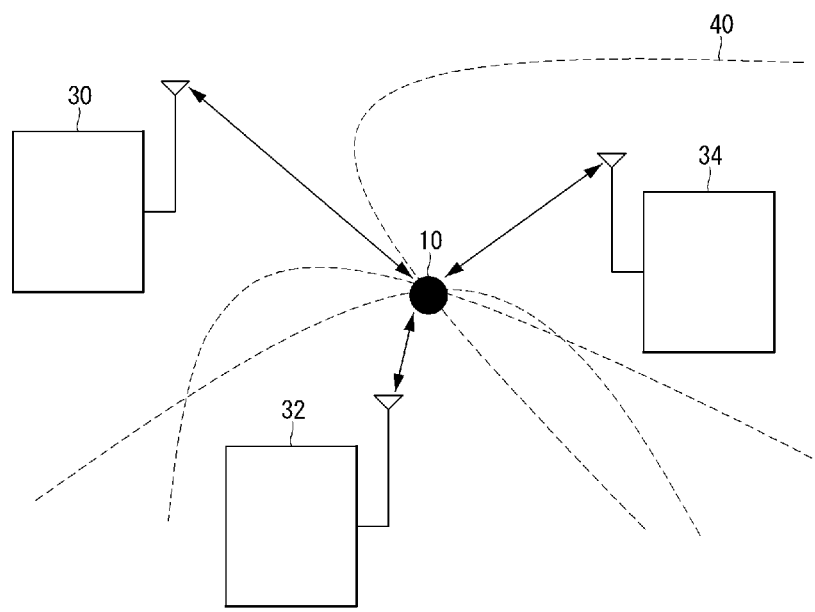
FIG. 9 is a conceptual diagram for describing a position estimation method using a distance difference that can be employed in the hybrid method of the present exemplary embodiment.

FIG. 6 is a conceptual diagram for describing a position estimation method using a radio wave signal that can be employed in the hybrid method of the present exemplary embodiment. FIG. 7 is a conceptual diagram for describing an position estimation method utilizing angles that can be employed in the hybrid method of the present exemplary embodiment. FIG. 8 is a conceptual diagram for describing a position estimation method using a distance and an angle simultaneously that can be employed in the hybrid method of the present exemplary embodiment. FIG. 9 is a conceptual diagram for describing a position estimation method using a distance difference that can be employed in the hybrid method of the present exemplary embodiment.

Referring to FIG. 6, in positioning using radio wave signals, a position of a user or a positioning target terminal may be determined by measuring a distance and a signal transmission/reception angle using a signal propagation time between a transmitter and a receiver. For example, if transmission powers of the positioning reference nodes 30, 32, and 34 are known, the positioning apparatus may estimate the position of the positioning target terminal 10 by mapping a signal strength of a reception signal (e.g., received signal strength indicator (RSSI)) measured at the positioning reference node to a distance r1.

For example, after measuring a time difference (i.e., Time of Flight, ToF), that is, a signal propagation time between a radio wave transmission time of a transmitter of the positioning target terminal and a radio wave reception time of a receiver of the positioning reference node, the signal propagation time may be multiplied by a speed of light to estimate a distance between the transmitter and the receiver, and the position of the positioning target terminal may be estimated based on the estimated distance. In this case, for positioning on a two-dimensional plane, at least three positioning reference nodes may be required. In addition, in order to accurately estimate the distance, accurate synchronization between the transmitter and the receivers corresponding to the positioning reference nodes 30, 32, and 34 and the positioning target terminal 10, that is, matching a reference time, may be required.

In addition, the position of the positioning target terminal 10 may be estimated by measuring a round-trip signal propagation time (RToF) between the transmitter and the receiver. In this case, positioning may be possible without the need for accurate synchronization between the transmitter and receiver, but when applied to a single positioning scheme, there is a possibility of error accumulation due to an increase in signal propagation time compared to ToF.

In addition, as shown in FIG. 7, the position of the positioning target terminal 10 may be estimated through an angle of arrival (AoA) of radio waves between the transmitter and the receiver. In this case, at least two positioning reference nodes 30 and 32 are required for positioning on a two-dimensional plane, and there is a possibility that a small angle estimation error may cause a large positioning error as the distance increases between the transmitter and the receiver.

In addition, as shown in FIG. 8, when the distance ToF and the angle AoA are combined, the positioning of the positioning target terminal 10 may be possible only with at least one positioning reference node 30. However, in the case of positioning using only one positioning reference node, acquisition accurate synchronization and angle measurement between the transmitter and the receiver are required.

In addition, as shown in FIG. 9, the positioning of the positioning target terminal 10 may be performed by utilizing a signal propagation time difference (i.e., Time Difference of Arrival, TDoA) received from another transmitter. That is, the position of the positioning target terminal 10 may be estimated based on an intersection of circles or hyperbolas 40 each of which has a radius of an estimated distance from each of reflective positions identifier by the positioning reference nodes 30, 32, and 34 to the positioning reference signal. In this case, as in the combination of ToF and AoA, it is required to match a reference time between the positioning reference nodes, not a reference time between the transmitter and the receiver.

The above-described positioning using the aforementioned radio wave signals may secure an identifier (ID) for the positioning target terminal by utilizing information carried in the radio wave signals as well as position information on the positioning target terminal.

On the other hand, the positioning using images may identify a user position by securing feature points that are references for distance measurement in a 3D map, and if there is no 3D map, the user information of the user may be identified based on depth information extracted using two or more cameras. In addition, if the characteristics of the measurement object are identified, it is possible to identify the measurement object from the image information.

Figure 10:
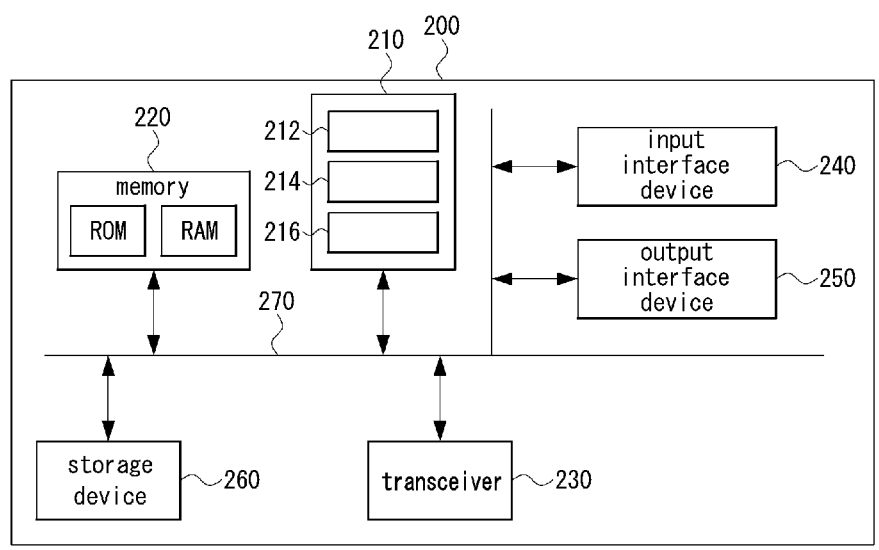
FIG. 10 is a schematic block diagram illustrating a configuration of a hybrid positioning apparatus according to another exemplary embodiment of the present disclosure.

FIG. 10 is a schematic block diagram illustrating a configuration of a hybrid positioning apparatus according to another exemplary embodiment of the present disclosure.

Figure 11:
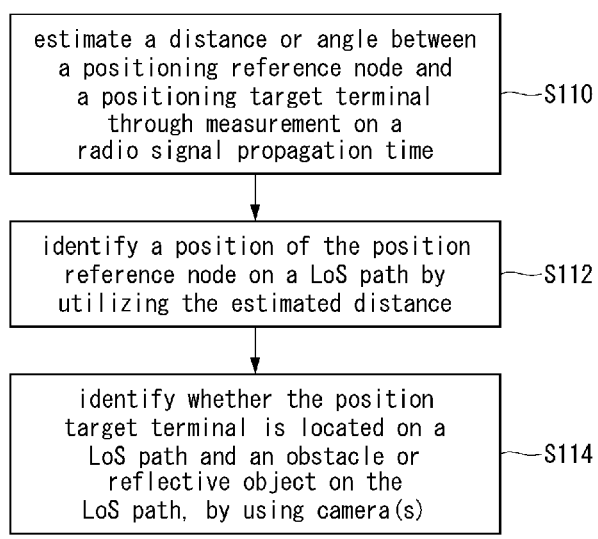
FIG. 11 is a flowchart for describing a main operation principle of the hybrid positioning apparatus of FIG. 10.

FIG. 11 is a flowchart for describing a main operation principle of the hybrid positioning apparatus of FIG. 10.

Referring to FIG. 10, a hybrid positioning apparatus 200 may comprise at least one processor 210, a memory 220, and a transceiver 230 connected to the network for performing communications. Also, the hybrid positioning apparatus 200 may further comprise an input interface device 240, an output interface device 250, a storage device 260, and the like. The respective components included in the hybrid positioning apparatus 200 may communicate with each other as connected through a bus 2370.

However, the respective components included in the hybrid positioning apparatus 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

When describing a main operation principle of the hybrid positioning apparatus 200, the hybrid positioning apparatus may estimate a distance and/or angle between the positioning reference node and the positioning target terminal through measurement of propagation times of radio signals as shown in FIG. 11 (S110), may identify a position of the positioning target terminal on a LOS path by utilizing the estimated distance (S112), may identify whether the positioning target terminal is located on a LOS path, and identify reflective objects or obstacles on the LOS path by using images of camera(s) (S114), and identify the position of the positioning target terminal based on the estimated and identified distance and a reflection angle at the reflective object.

To this end, in the hybrid positioning apparatus, as shown in FIG. 10, when program instructions are executed by the processor 210, the processor 210 may implement at least one or more software modules such as a first estimator 212, a second estimator 214, a third estimator 216, and a fourth estimator. Here, the first estimator 212 may operate to estimate the distance and/or angle between the positioning reference node and the positioning target terminal through measurement of propagation times of radio signals, the second estimator 214 may operate to identify the position of the positioning target terminal on a LOS path by utilizing the distance estimated by the first estimator 212. The third estimator 216 may operate to identify whether the positioning target terminal is located on a LOS path and reflective objects or obstacles on the LOS path by using image of camera(s), and the fourth estimator may operate to identify the position of the positioning target terminal based on the estimated and identified distance and a reflection angle at the reflective object.

When the above-described hybrid positioning apparatus 200 is installed in a positioning reference node, the positioning reference node may be connected to or mounted on various communication systems or communication nodes.

The communication system may include a core network, for example, a serving-gateway (S-GW), a packet data network (PDN)-gateway (P-GW), a mobility management entity (MME), and the like. When the communication system is a 5G communication system, for example, a new radio (NR) system, the core network may include an access and mobility management function (AMF), a user plane function (UPF), a session management function (SMF), and the like.

In addition, the communication system may support three types of frame structures. A frame structure of type 1 may be applied to a frequency division duplex (FDD) communication system, a frame structure of type 2 may be applied to a time division duplex (TDD) communication system, and a frame structure of type 3 may be applied to an unlicensed band-based communication system. For example, it may be applied to a licensed assisted access (LAA) communication system.

The communication node may be configured to support communication protocols defined in the 3rd generation partnership project (3GPP) specifications, for example, the LTE communication protocol, the LTE-A communication protocol, the NR communication protocol, and the like. That is, the communication node may support communication technologies such as code division multiple access (CDMA), wideband CDMA (WCDMA), time division multiple access (TDMA), frequency division multiple access (FDMA), orthogonal frequency division multiplexing (OFDM), filtered OFDM, cyclic prefix (CP)-OFDM, discrete Fourier transform-spread-OFDM (DFT-s-OFDM), orthogonal frequency division multiple access (OFDMA), single carrier (SC)-FDMA, non-orthogonal multiple access (NOMA), generalized frequency division multiplexing (GFDM), filter bank multi-carrier (FBMC), universal filtered multi-carrier (UFMC), space division multiple access (SDMA), and the like.

The communication system including a plurality of communication nodes may form a macro cell. In this case, each communication node may form a small cell or a base station. Here, the base station may be referred to as NodeB (NB), evolved NodeB (eNB), gNB, advanced base station (ABS), high reliability-base station (HR-BS), base transceiver station (BTS), radio base station, radio transceiver, access point, access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), or the like.

In addition, a plurality of base stations may operate in different frequency bands or may operate in the same frequency band. The plurality of base stations may be connected to each other through an ideal backhaul link or a non-ideal backhaul link, and may exchange information with each other through an ideal backhaul link or a non-ideal backhaul link. The plurality of base stations may be connected to the core network through an ideal backhaul link or a non-ideal backhaul link. The plurality of base stations may transmit signals received from the core network to a corresponding terminal, and may transmit signals received from the corresponding terminal to the core network.

In addition, the plurality of base stations may support transmission schemes or communication schemes such as MIMO transmissions, for example, single user (SU)-MIMO, multi user (MU)-MIMO, massive MIMO, coordinated multipoint (CoMP), carrier aggregation (CA), unlicensed band, device-to-device communication (D2D) (or proximity services (ProSe)), Internet of Things (IoT) communications, dual connectivity (DC), and/or the like.

The above-mentioned positioning target terminal may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on board unit (OBYU), or the like.

As described above, although the position of the positioning target terminal on a LOS path can be accurately measured by using the existing positioning system, the existing positioning system has a problem causing a lot of errors in estimating the position of the position target terminal on a NLOS path. The present disclosure proposes a new positioning method capable of improving the accuracy of positioning of the positioning target terminal on an NLOS path while solving the above-described problem.

In addition, according to the present disclosure, positioning information for a user or a measurement target located indoors or in dense urban areas is provided by using radio signals, and positioning information for a user located on a LOS path from a camera is provided by using image information. Accordingly, accurate positioning is possible regardless of the position where the user or measurement target is located.

In addition, according to the present disclosure, angle and distance information may be obtained through a positioning method that combines image information and radio positioning technology to obtain accurate position information for a positioning target or user terminal existing on a NLOS path, and signal reflection positions are identified based on the angle and distance information. Based thereon, the position of the positioning target terminal may be effectively and precisely estimated through reflection angles or an intersection of circles having the same radius.

In addition, according to the present disclosure, by utilizing radio waves of a high frequency band, for example, millimeter wave (mmWave) or terahertz (THz) band, which has a small effect of radio wave reflection, advantages may be obtained in that a wide bandwidth of the corresponding frequency band can be utilized to achieve distance accuracy, angular accuracy is enhanced by a super large number of antennas, and thus the positioning can be efficiently performed.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A positioning method using images and radio waves, performed by a positioning reference node, the positioning method comprising:
    estimating a distance and an angle from the positioning reference node to a positioning target terminal;
    identifying an obstacle or reflective object in a vicinity of the positioning target terminal or on a path between the positioning target terminal and the positioning reference node by using image information on the positioning target terminal at a position estimated by the distance and the angle;
    estimating an incident angle or a reflection angle of a radio wave signal reflected by the reflective object identified based on the image information; and
    estimating a position of the positioning target terminal based on the reflection angle and the distance.

2. The positioning method according to claim 1, further comprising determining whether the positioning target terminal is located on a non-line of sight (NLOS) path.

3. The positioning method according to claim 2, further comprising in response to determining that the positioning target terminal is located on a NLOS path, estimating a distance between the positioning reference node and the reflective object on a LOS path by using the image information.

4. The positioning method according to claim 1, wherein the radio wave signal is a signal of a millimeter wave (mmWave) or terahertz (THz) band having a relatively small radio wave reflection effect.

5. The positioning method according to claim 1, wherein the radio wave signal is a signal of a millimeter wave (mmWave) or terahertz (THz) band having a relatively large bandwidth.

6. The positioning method according to claim 1, wherein the radio wave signal is a signal of a millimeter wave (mmWave) or terahertz (THz) band using a very large number of antennas.

7. A positioning method using images and radio waves, performed by a positioning apparatus, the positioning method comprising:
    estimating, by each of a plurality of positioning reference nodes, a distance or an angle from each of the plurality of positioning reference nodes to a positioning target terminal;
    identifying, by each of the plurality of positioning reference nodes, an obstacle or reflective object in a vicinity of the positioning target terminal or on a path between the positioning target terminal and each of the plurality of positioning reference nodes by using image information on the positioning target terminal at a position range of the positioning target terminal estimated by the distance or the angle;
    identifying, by each of the plurality of measurement reference nodes, reflection positions of radio wave signals reflected by the reflective object identified through the image information; and
    estimating a position of the positioning target terminal by using an intersection of circles each of which has a radius corresponding to a distance from each of the reflection positions to the positioning target terminal.

8. The positioning method according to claim 7, further comprising determining whether the positioning target terminal is present on a non-line of sight (NLOS) path.

9. The positioning method according to claim 7, wherein the radio wave signal is a signal of a millimeter wave (mmWave) or terahertz (THz) band having a relatively small radio wave reflection effect.

10. The positioning method according to claim 7, wherein the radio wave signal is a signal of a millimeter wave (mmWave) or terahertz (THz) band having a relatively large bandwidth.

11. The positioning method according to claim 7, wherein the radio wave signal is a signal of a millimeter wave (mmWave) or terahertz (THz) band using a very large number of antennas.

12. A positioning apparatus using images and radio waves, the positioning apparatus comprising:
- a processor; and
- a memory storing at least one instructions executable by the processor,
- wherein the at least one instruction causes the processor to:
- estimate, by each of a plurality of positioning reference nodes, a distance or an angle from each of the plurality of positioning reference nodes to a positioning target terminal;
- identify, by each of the plurality of positioning reference nodes, an obstacle or reflective object in a vicinity of the positioning target terminal or on a path between the positioning target terminal and each of the plurality of positioning reference nodes by using image information on the positioning target terminal at a position range of the positioning target terminal estimated by the distance or the angle;
- identify, by each of the plurality of measurement reference nodes, reflection positions of radio wave signals reflected by the reflective object identified through the image information; and
- estimate a position of the positioning target terminal by using an intersection of circles each of which has a radius corresponding to a distance from each of the reflection positions to the positioning target terminal.

13. The positioning apparatus according to claim 12, further comprising determining whether the positioning target terminal is present on a non-line of sight (NLOS) path.

14. The positioning apparatus according to claim 12, wherein the radio wave signal is a signal of a millimeter wave (mmWave) or terahertz (THz) band having a relatively small radio wave reflection effect.

15. The positioning apparatus according to claim 12, wherein the radio wave signal is a signal of a millimeter wave (mmWave) or terahertz (THz) band having a relatively large bandwidth.

16. The positioning apparatus according to claim 12, wherein the radio wave signal is a signal of a millimeter wave (mmWave) or terahertz (THz) band using a very large number of antennas.

* * * * *